US012462631B2

(12) United States Patent
Wallman-Carlsson

(10) Patent No.: US 12,462,631 B2
(45) Date of Patent: Nov. 4, 2025

(54) COIN HANDLING DEVICE AND A COIN HANDLING MACHINE COMPRISING THE SAME

(71) Applicant: SCAN COIN AB, Malmö (SE)

(72) Inventor: Victor Wallman-Carlsson, Malmö (SE)

(73) Assignee: SCAN COIN AB, Malmö (SE)

( * ) Notice: Subject to any disclaimer, the term of this patent is extended or adjusted under 35 U.S.C. 154(b) by 756 days.

(21) Appl. No.: 17/783,187

(22) PCT Filed: Dec. 8, 2020

(86) PCT No.: PCT/EP2020/085078
§ 371 (c)(1),
(2) Date: Jun. 7, 2022

(87) PCT Pub. No.: WO2021/116105
PCT Pub. Date: Jun. 17, 2021

(65) Prior Publication Data

US 2023/0008036 A1 Jan. 12, 2023

(30) Foreign Application Priority Data

Dec. 10, 2019 (EP) .................................... 19215021

(51) Int. Cl.
*G07D 11/10* (2019.01)
*G07D 3/12* (2006.01)
*G07D 9/00* (2006.01)

(52) U.S. Cl.
CPC ............. *G07D 11/10* (2019.01); *G07D 3/128* (2013.01); *G07D 9/008* (2013.01); *G07D 2201/00* (2013.01)

(58) Field of Classification Search
CPC ........ G07D 11/10; G07D 3/128; G07D 9/008; G07D 2201/00
See application file for complete search history.

(56) References Cited

U.S. PATENT DOCUMENTS 5,017,176 A 5/1991 Swierczek
6,030,284 A 2/2000 Frank
(Continued)

FOREIGN PATENT DOCUMENTS

EP 4057241 A1 * 9/2022 ............. G07D 9/008
JP H0843400 A * 2/1996

OTHER PUBLICATIONS

JP-H0843400-A—English Translation of original Document (Year: 1996).*
(Continued)

*Primary Examiner* — Kevin T Bates
*Assistant Examiner* — Poonam Sharma
(74) *Attorney, Agent, or Firm* — Brooks Kushman P.C.

(57) ABSTRACT

A coin handling device for a coin handling machine includes a coin container, a coin output arrangement, and a coin jam preventing arrangement. The coin jam preventing arrangement includes a coin jam preventing element and a flexible link having a free and a fixed end. The coin jam preventing element is suspended in a volume of the coin container at the free end of the flexible link such that the coin jam preventing element is able to, freely, move around within a predefined volume at least at the lower end of the coin container to physically interact with coins of the mass of coins present in the predefined volume.

19 Claims, 9 Drawing Sheets

(56) References Cited

U.S. PATENT DOCUMENTS

| | | | | |
|---|---|---|---|---|
| 2002/0090906 | A1* | 7/2002 | Abe | G07D 9/008 453/57 |
| 2011/0263190 | A1* | 10/2011 | Stump | G07D 9/008 453/57 |
| 2014/0080395 | A1 | 3/2014 | Takeuchi et al. | |
| 2015/0228140 | A1* | 8/2015 | Martin | G07D 3/16 453/3 |
| 2016/0364932 | A1* | 12/2016 | Hu | G07D 1/00 |

OTHER PUBLICATIONS

International Search report for PCT/EP2020/085078, prepared by the European Patent Office, mailing date Feb. 17, 2021, 3 pages.

* cited by examiner

COIN HANDLING DEVICE AND A COIN HANDLING MACHINE COMPRISING THE SAME

CROSS-REFERENCE TO RELATED APPLICATION

This application is the U.S. national phase of PCT Application No. PCT/EP2020/085078 filed on Dec. 8, 2020, which claims priority to EP Patent Application No. 19215021.7 filed on Dec. 10, 2019, the disclosures of which are incorporated in their entirety by reference herein.

FIELD OF INVENTION

The present inventive concept relates to a coin handling device. In particular, the present inventive concept relates to a coin handling device comprising a coin jam preventing arrangement. The present inventive concept further relates to a coin handling machine comprising the coin handling device.

BACKGROUND

Coin handling machines are useful whenever there is a need for handling, such as e.g. sorting and/or counting and/or dispensing, large quantities of coins. Such machines can for example receive a number of mixed coins which are to be counted and/or sorted based on parameters such as size and denomination. Some coin handling machines comprise a coin handling device configured to receive a mass of coins input thereto in a coin container or a coin hopper for selectively transporting or dispensing the received coins from the coin handling device when needed. One kind of such a coin handling device is a coin feeding device intended to receive a great number of coins, and to feed those coins one after another to a coin sorting device. Another kind of such a coin handling device is a coin dispenser, which is configured to hold a mass of coins of a particular denomination and selectively dispense coins from the coin dispenser when needed. Both these kinds of coin handling devices comprise a mechanism for outputting or transporting coins from the device, a mechanism that often includes a rotating disk.

When handling these large quantities of coins however, coin jams of various magnitude and kind are inevitable and can disrupt the working operation of the apparatus Such disruption causes a reduction of efficiency, and/or jeopardizes the accuracy by increasing the risk of a miscount. In some instances, the coin handling apparatus has coin jam detecting devices that automatically shuts the machine down in case of a jam, thus requiring assistance of operator personnel to manually intervene in order to resume the apparatus operation. This can be both time consuming and requires the continuous attendance of trained staff.

Previous work in this area includes U.S. Pat. No. 5,017,176 which discloses a bulk coin hopper having a flexible flap to urge coins into coin receiving bores within a top of a rotating disc. US 2014/0080395 discloses a coin depositing and dispensing machine having a pooling and feeding apparatus to which received coins are sent to be pooled, the pooling and feeding apparatus being configured to feed out, one by one, coins pooled therein. U.S. Pat. No. 6,030,284 discloses a coin transferring device provided with a first and a second element between which a transportation channel for coins is disposed, wherein the first element is movable with respect to the second element so as to affect the transferring of the coins. US 2002/0090906 A1 discloses a coin dispensing apparatus having a coin hopper for storing bulk coins in a rotating disk coin selector mounted at a lower portion of coin hopper. An agitator member can be mounted to extend upward from the rotating disk coin selector to agitate the stored coins.

In order to maintain a sufficiently high accuracy and reliability of the coin handling apparatuses, it is thus desirable to provide an improved way of avoiding jam interruptions.

SUMMARY OF INVENTION

The object of the present invention is to eliminate or at least reduce the problems discussed above, as well as other problems. This is at least partly achieved with an apparatus in accordance with the appended independent claims.

According to a first aspect of the invention, there is provided a coin handling device for a coin handling machine. The coin handling machine comprises a coin container configured to hold a mass of coins input thereto, wherein the coin container comprises a coin output arrangement arranged at a lower end thereof, said coin output arrangement being configured to output one or more coins of the mass of coins from the coin container; wherein the coin output arrangement comprises a rotatable disk located at a bottom of the coin container, wherein the rotatable disk includes one or more coin engaging elements defined on the rotatable disk on a coin facing surface thereof, each of the one or more coin engaging elements being configured to engage an individual coin of the mass of coins to allow said individual coin to be output from the coin container; wherein the coin handling device further comprises a coin jam preventing arrangement including a coin jam preventing element and a flexible link having a free and a fixed end, wherein the coin jam preventing element is suspended in a volume of the coin container at the free end of the flexible link such that the coin jam preventing element is able to, freely, move around within a predefined volume at least at the lower end of the coin container to physically interact with coins of the mass of coins present in the predefined volume.

An advantage of having a coin jam preventing arrangement according to the disclosure is that coin jams of various kinds can be prevented. Thus, interruptions in the coin handling machine's operation can be avoided. This allows for a coin handling machine that doesn't need constant supervision and/or interference by trained personnel. The machine thus becomes more reliable, efficient and cheaper to operate. An advantage of having a coin jam preventing arrangement of the disclosure is that it may interact with coin jams thereby breaking them and eliminate the jam.

One kind of such coin jams results from coin bridge formation. The typical shape of coins makes them prone to accumulate in a certain way with respect to each other. Sometimes this results in the adverse effect that coin bridge formations are formed extending e.g. between inner walls of the coin container or coin hopper. Coin bridge formation results in a jam in the operation as no coins may be dispensed or transported from the coin handling device. Another kind of coin jam occurs when individual coins are stuck on, or at, the coin output arrangement, e.g. on the rotating disk.

By providing the coin jam preventing element suspended on the flexible link, the coin jam preventing element may freely roam around within a predetermined volume determined by the dimensions of the coin container and the length and the relative location of the free end of the flexible link. Moreover, the suspended coin jam preventing element will, as a result from gravity, strive to move towards a predetermined rest position. As a result of this, the coin jam preventing element will, during movement thereof, predominately, or at least repeatedly, be located in a vicinity of, and at, this rest position. Thus, it is understood that the rest position may be different for different coin jam preventing arrangements. When coins are input to and/or output from the coin container, there will be a movement of coins within the coin container which may trigger a movement of the coin jam preventing element from the rest position such that the coin jam preventing element may further interact with coins in the coin container so as to prevent coin jams from being formed or to break coin jams in the coin container.

The flexible link may consist of one single element, such as a wire. However, the flexible link may alternatively consist of more than one element. The flexible link may include a first link element and a second link element, wherein the first and second link element are made from a different material. As an example, the first link element may be a steel wire, and the second link element may be a chain. The first link element may be less flexible than the second link element. As an example, the first link element may be a steel wire and the second link element an elastic rod, e.g. made from rubber or polyurethane.

The term "flexible link" should be construed as an interconnecting link which provides a flexibility for the coin jam preventing element to move around inside the coin container. The flexibility of the flexible link should not be limited to a flexibility in angular positions. The flexible link may, at least partly, be made from a resilient material so as to allow the coin jam preventing element to reach positions located further away from the fixed position than would be possible with a flexible link of the same length not including such a resilient material.

It is to be noted, that the term coin "jam" used throughout this application, is to be interpreted as any and all kinds of jam(s) of a coin inside a coin handling device. One example of such a jam is "bridging", wherein several coins end up in positions in which they together form a bridge, interconnecting stationary surfaces of the coin container. Another type of jam occurs when one or more coins gets stuck in the coin output arrangement, such that the one or more coins cannot be output from the coin handling device. This could for example entail two or more coins ending up stacked on each other in a through-opening. A jam does not necessarily interrupt the function of the coin handling device, e.g. that the movement of a rotatable disk is prevented, such that the coin handling device needs to be shut down and reset. Rather, a jam can be interpreted as any formation or placement of a coin or coins which reduces efficiency of the normal operation of the coin handling device.

Further, the term coin "container" is to be understood as any volume of the coin handling device that is adapted to receive and hold a mass of coins, such as a bowl or hopper.

When using the term "freely", with respect to an element moving or roaming freely, it is to be understood that the element is able to move around freely within a predefined volume but may be restricted to move outside of the predefined volume. Hence, the coin jam preventing element may be able to move freely by an angular relation between the fixed end and the free end of the flexible link being unrestricted and, possibly, by a distance between the fixed end and the free end being able to change somewhat due to a resilience of the flexible link. The movement of the coin jam preventing element may further be restricted by structures, such as inner walls, in the coin container.

According to some embodiments, the coin handling device is a coin dispenser configured to dispense coins of the mass of coins individually from the coin container. This kind of coin output arrangements are commonly used for coin dispensers which are arranged inside coin handling machines such as coin depositing and dispensing machines used at banks and large financial institutions. However, coin dispensers may also be used in coin handling apparatuses intended for us at a point of sale.

According to some embodiments, each of the coin engaging elements is defined by walls surrounding a through-opening formed in the rotatable disk for allowing the individual coin to pass through the rotatable disk via the through-opening to be output from the coin container. The coin output arrangement may include one or more further structural elements located on an opposite side of the rotatable disk with respect to the coin facing surface. The coin output arrangement may be configured such as to receive the individual coin in a through-opening of the rotatable disk such that the individual coin is residing inside the through-opening extending with its flat side in the plate defined by the rotatable disk. The through-openings may be circularly shaped having a diameter corresponding to the diameter of the individual coin such that the rotatable disk, when in use, will be able to move the individual coin with the rotatable disk along a circular path within the plane of the rotatable disk. The individual coin may be supported by the one or more further structural elements from below. A coin dispensing mechanism may be arranged on an opposite side of the rotatable disk with respect to the coin facing surface. The coin dispensing arrangement may be configured to dispense the individual coin from a position located along the circular path, to output the individual coin from the coin handling device.

According to some embodiments, the rotatable disk is inclined with respect to a horizontal plane so as to define an upper coin engaging area and a lower coin engaging area, and the coin jam preventing element is suspended at the free end of the flexible link such that the coin jam preventing element will, when residing in a rest position of the flexible link, be located within the upper coin engaging area and in contact with the rotatable disk.

The advantage of having a rest position of the coin jam preventing element within the upper coin engaging area is that the coin jam preventing element will be less prone from disturbance from coins residing in the lower part of the coin container. This may allow the coin jam preventing element to interact with a plurality of coins being jammed within a through-opening of the rotatable disk as detailed hereinabove. Such coin jams may, if not resolved, result in that the jammed coins will continue rotating with the rotatable disk along the circular path and not get dispensed from the coin handling device.

Although the rotatable disk of the above described embodiments are inclined with respect to the horizontal plane, it is also conceivable that the rotatable disk is not inclined with respect to the horizontal plane. In such embodiments, the rotatable disk may thus be parallel with the horizontal plane. The coin jam preventing element may be suspended at the free end of the flexible link such that the coin jam preventing element will, when residing in a rest position of the flexible link, be located at, or on, the rotatable disk. For some embodiments, it is conceivable that the coin jam preventing element is suspended from the free end of the flexible link such that the rest position is located at a position of the rotatable disk being proximal to the fixed end.

As readily realized by the person skilled in the art, the position of the fixed end in relation to the coin container, and the length of the flexible link will depend on the geometry of the coin container, the geometry and functionality of the rotatable disk, and potentially also on the geometry of the coins of the mass of coins. All these factors are, to varying degree, affecting the general movement of the coins within the coin handling device, and thus also affecting the statistical probability of coin jams in specific regions of the coin handling device.

According to some embodiments, each of the coin engaging elements is defined by a recess, or a protrusion, formed on the coin facing surface, wherein the recess, or protrusion, is configured to engage with the individual coin to transport the same along a coin transport path for outputting the individual coin from the coin container.

According to some embodiments, the coin handling device is a coin feeding unit configured to feed coins of the mass of coins, one by one, to an output position of the coin feeding unit at which output position each coin is allowed to leave the coin feeding unit along a predefined coin path.

According to some embodiments, the coin jam preventing element is suspended at the free end of the flexible link such that the coin jam preventing element will, when residing in a rest position of the flexible link, be located distanced from the rotatable disk.

The coin jam preventing element may be suspended at the free end of the flexible link such that the coin jam preventing element will, when residing in a rest position of the flexible link, be located distanced from a bottom end of the coin container.

The coin jam preventing element may be suspended at the free end of the flexible link such that the coin jam preventing element will, when residing in a rest position of the flexible link, be located distanced from inner walls of the coin container.

The coin jam preventing element may be suspended at the free end of the flexible link such that the coin jam preventing element will, when residing in a rest position of the flexible link, be located in an upper portion of the coin container.

This geometry may in some situations be advantageous as it allows for resolving coin jams, such as e.g. coin bridges, at other positions within the coin container, such as for example positions located in the upper or intermediate region of the coin container. Furthermore, it is conceivable to combine coin jam preventing elements operating at a lower level of the coin container with coin jam preventing elements operating at a higher level of the coin container.

According to some embodiments, the flexible link is formed by one or more from: a wire, a string, a line and a chain. An advantage of using a wire is that it is durable and allows for a certain resilience angularly.

According to some embodiments, the coin jam preventing element is made from a metallic material.

According to some embodiments, the coin jam preventing element has a weight exceeding a weight of each coin of the mass of coins.

An advantage of having a coin jam preventing element with a weight exceeding the weight of a coin in the mass of coins, is that the physical impact, i.e. the force from the coin jam preventing element exerted on the coin jams when the coin jam preventing element makes contact with the coins being jammed, will be sufficient to successfully eliminate the jams. Also, the coin jam preventing element may be more efficient in working its way through a mass of coins during operation of the coin handling device to keep close to, or at, the rest position.

According to some embodiments, the coin jam preventing element has a rounded shape. The coin jam preventing element may have a spherical shape. By not having any sharp edges on the coin jam preventing element, the risk of the element itself giving rise to any jams, or gets stuck, is decreased.

The weight of the coin jam preventing element may exceed the weight of an individual coin. The shape of the coin jam preventing element may be based on properties of the coin denominations, such as weight and/or dimensions of coins of a respective denomination. The coin jam preventing element may have a spherical shape. The coin jam preventing element may have an oblong rounded shape, such as e.g. a prolate shape or a compressed rounded shape, such as e.g. an oblate shape. The coin jam preventing element may have a density exceeding a density of each coin of the mass of coins. The coin jam preventing element may have a maximum dimension exceeding a maximum outer dimension of each coin of the mass of coins.

The coin jam preventing element may be integrally formed from one material, such as a metal, or a metal alloy. Alternatively, the coin jam preventing element may consist of more than one material. The coin jam preventing element may for example comprise a first, inner, element of a first material and a second, outer, element of a second material. The second material may be a resilient material such as polyurethane or rubber. The second element may, partly or completely, encompass the first element.

According to some embodiments, the coin jam preventing arrangement further includes a further coin jam preventing element which is un-connected to the coin handling device such that the further coin jam preventing element is able to, freely, move around within the coin container to physically interact with the coin jam preventing element and the coins of the mass of coins present in the coin container. An advantage of having a further coin jam preventing element is that the two elements give rise to a synergistic effect in which the two elements physically interact with each other to break coin jams. Another advantage is that the second coin jam preventing element may aid in breaking free the first coin jam preventing element should it get stuck.

According to a second aspect of the present invention, there is provided a coin dispenser system for a coin handling machine. The system comprises: a plurality of coin dispensers, wherein each coin dispenser comprises: a coin container configured to hold a respective mass of coins input thereto, wherein the coin container comprises a coin output arrangement arranged at a lower end thereof, said coin output arrangement being configured to output one or more coins of the respective mass of coins from the coin container; wherein the coin output arrangement comprises a rotatable disk located at a bottom of the coin container, wherein the rotatable disk includes one or more coin engaging elements defined on the rotatable disk on a coin facing surface thereof, each of the one or more coin engaging elements being configured to engage an individual coin of the mass of coins to allow said individual coin to be output from the coin container;

wherein each coin dispenser of the plurality of coin dispensers is configured to dispense coins of the respective mass of coins individually from the coin container, and wherein the coin dispenser system comprises at least a first coin dispenser and a second coin dispenser among the plurality of coin dispensers and wherein the first and the second coin dispensers are configured to hold and output coins of a first individual denomination and a second, different individual denomination, respectively, and wherein each of the first and the second coin dispensers further comprises an associated coin jam preventing arrangement each including a coin jam preventing element which is able to, freely, move around within at least a portion of a volume of the associated coin container to physically interact with coins of the mass of coins present in the portion of the volume, and wherein the coin jam preventing arrangement of the first coin dispenser is adapted to the first individual denomination and the coin jam preventing arrangement of the second coin dispenser is adapted to the second individual denomination such that the coin jam preventing arrangement of the first coin dispenser is different from the coin jam preventing arrangement of the second coin dispenser.

The first and the second dispensers may be configured to receive a particular pre-determined denomination of coins, respectively. Thus, it is known which denomination is to be received by the respective coin dispenser. By adapting the coin jam preventing arrangements to each individual denomination, the coin jam preventing element may be adapted for preventing coin jams of the particular denomination. Thus, it may be ensured that the optimal effect of the coin jam preventing element is achieved.

According to some embodiments of the system, at least one of the coin dispensers includes a coin jam preventing arrangement including a coin jam preventing element and a flexible link having a free and a fixed end, wherein the coin jam preventing element is suspended in a volume of the coin container at the free end of the flexible link such that the coin jam preventing element is able to, freely, move around within a predefined volume at least at the lower end of the coin container to physically interact with coins of the mass of coins present in the predefined volume.

It should be realized that each of the plurality of coin dispensers in the coin dispenser system need not necessarily include a coin jam preventing element. Thus, in some coin dispensers it may not be necessary to have any coin jam preventing element, e.g. if the denomination of coins to be received by the coin dispenser is not prone to coin jams. Further, it should be realized that, while the coin jam preventing arrangement of the first coin dispenser is different from the coin jam preventing arrangement of the second coin dispenser, two or more coin dispensers in the coin dispenser system may comprise identical coin jam preventing elements, e.g. if the coin dispensers are configured to receive coins of the same denomination and/or if an identical coin jam preventing element may be efficient for handling coin jams of the coins received in the respective coin dispensers.

According to some embodiments of the second aspect of the present invention, the weight of the coin jam preventing element of the first and the second dispenser, respectively, is based on a weight and/or dimension of the first and second individual denomination, respectively. By adapting the weight of the coin jam preventing element to each individual denomination, it is ensured that the optimal effect of the coin jam preventing element is achieved.

According to a third aspect, there is provided a coin handling machine comprising at least one coin handling device according to the first aspect, or a coin dispenser system according to the second aspect.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise. Preferred embodiments appear in the claims and in the description.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings. It is also to be noted, that each feature disclosed in a drawing, unless explicitly stated, can be combined or exchanged with corresponding features from other drawings.

DETAILED DESCRIPTION OF PREFERRED EMBODIMENTS

Figure 1A:
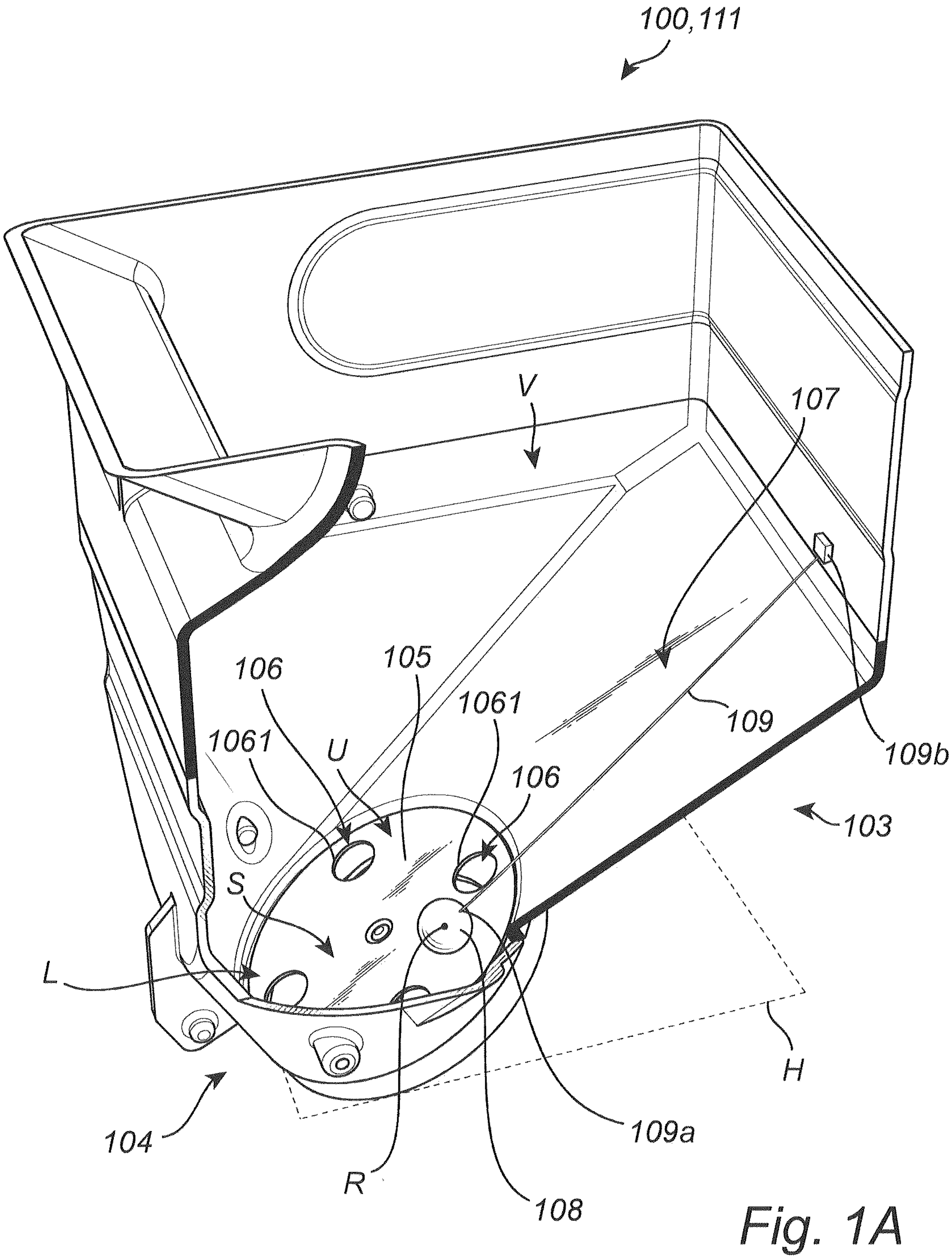
FIG. 1*a* is a perspective view of a coin handling device with a coin jam preventing arrangement according to embodiments of the invention.

FIG. 1*a* is a perspective view of a coin handling device 100 with a coin jam preventing arrangement 107. The coin handling device 100 is illustrated also in FIG. 1*b* in a side perspective view. The coin handling device 100 is of a kind often known as a coin dispenser 111, and is typically used in coin handling machines for holding, and selectively dispensing coins of a particular denomination within the coin handing machine. Thus, although the disclosure is not so limited, coin dispensers are typically configured to handle one denomination only.

The coin handling device 100 in FIG. 1*a* has a coin container 103 for holding a mass of coins. The coin dispenser 111 in FIG. 1*a* comprises an output arrangement 104 for outputting one or more coins from the coin container 103. The coin output arrangement 104 has a rotatable disk 105 located at the bottom of the coin container 103. The rotatable disk 105 includes one or more coin engaging elements 106. In FIG. 1*a*, there are four coin engaging elements 106, it is however equally plausible that there are more or less coin engaging elements, such as three or five. The coin engaging elements 106 engages individual coins such that the coins can be output from the coin container 103. The coin engaging elements 106 are located on a coin facing surface S of the rotatable disk 105.

The coin handling device 100 in FIG. 1*a* comprises a coin jam preventing arrangement 107 which includes a coin jam preventing element 108. The coin jam preventing element 108 has a spherical, ball-like shape in FIG. 1*a*, but could also have other shapes (further described herein with reference to FIGS. 6*a-d*). The coin jam preventing element 108 is preferably made from a metallic material, such as steel. The weight of the coin jam preventing element 108 preferably exceeds the weight of an individual coin of the mass of coins in the container 103.

The coin jam preventing arrangement 107 further comprises a flexible link 109. The flexible link 109 may consist of one single element, such as a wire. However, the flexible link 109 may alternatively consist of more than one element. The flexible link 109 has a free end 109*a* and a fixed end 109*b*. The fixed end 109*b* may, as shown in FIG. 1*a*, be fixed to an inner wall of the container 103, and the coin jam preventing element 108 is suspended at the free end 109*a*. When suspended at the free end 109*a*, the coin jam preventing element 108 can freely move around within the container 103 in a predefined volume V. The predefined volume V at least includes the lower end of the container 103. In use of the coin handling device 100, the jam preventing element 108 physically interacts with the coins present in the volume V, and thereby breaks or in other ways eliminates coin jams. The flexible link 109 may be formed by a wire, a string, a line or a chain, or a combination thereof.

The coin engaging elements 106 on the rotatable disk 105 in FIG. 1*a* are through-holes, i.e. they are defined by the walls surrounding a through-opening 1061. Coins are output from the coin container 103 by passing through the rotatable disk 105 via the through-openings 1061. It is equally plausible that the coin engaging elements 106 consists of recesses or protrusions (not shown).

As can be seen in FIG. 1*a*, the rotatable disk 105 is inclined with respect to a horizontal plane H. The upper part of the rotatable disk 105 defines an upper coin engagement area U, and the lower part defines a lower coin engaging area L. The coin jam preventing element 108 may be suspended at the free end 109*a* of the flexible link 109 such that the coin jam preventing element 108, when in a rest position R, is located within the upper area U and is in contact with the rotatable disk 105.

When coins are transported along the inclined rotatable disk 105, coins may come in contact with the coin jam preventing element 108 and a friction, or impact, between a surface of a coin and a surface of the coin jam preventing element 108 may force the coin to move in relation to the rotatable disk 105, while the coin jam preventing element 108 may also be moved in relation to the fixed end 109*b*. If there is more than one coin being arranged protruding into a through-opening 1061, the contact between the coin jam preventing element 108 and at least one of the coins in the through-opening 1061 may pull the coin out of the through-opening 1061 such that the coins may orient themselves in relation to the through-opening 1061 so as not to cause a jam therein.

Figure 1B:
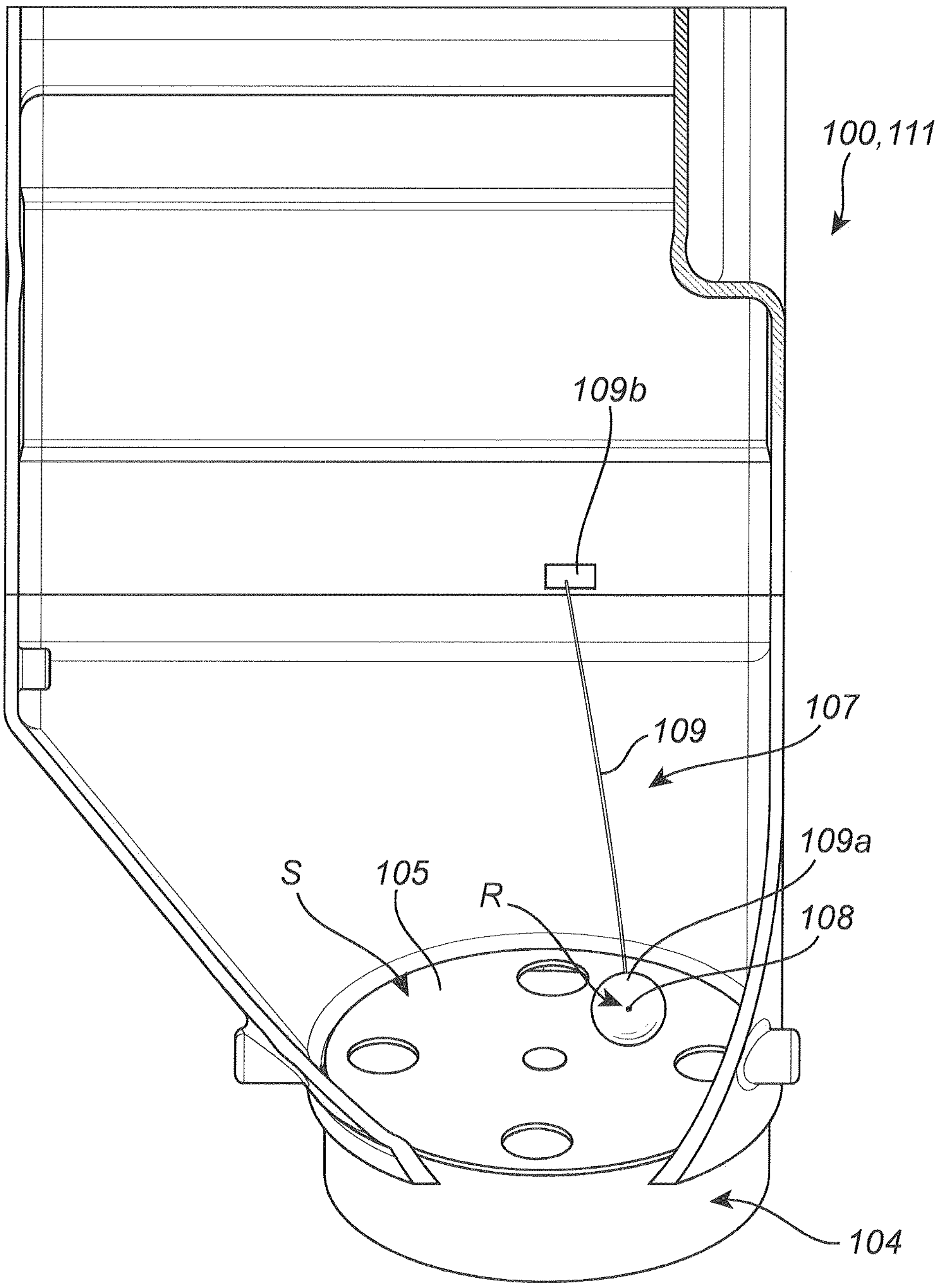
FIG. 1*b* is a side perspective view of a coin handling device with a coin jam preventing arrangement according to embodiments of the invention.
Figure 1C:
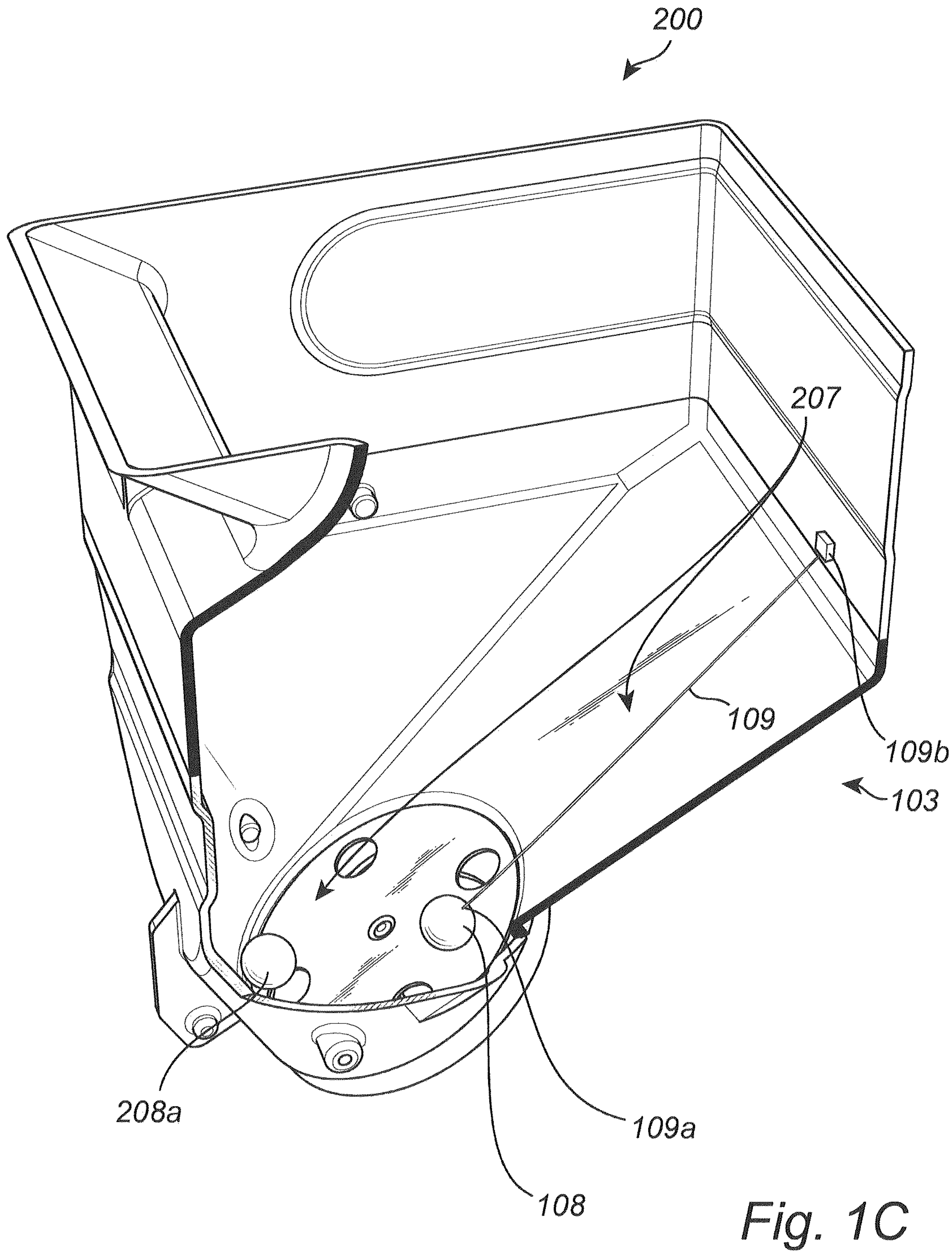
FIG. 1*c* is a perspective view of a coin handling device with a coin jam preventing element according to embodiments of the invention.

FIG. 1*c* is a perspective view of a coin handling device 200 according to an alternative embodiment. The coin handling device 200 shares most features with the coin handling device 100, but differs in that the coin jam preventing arrangement 207 includes both a coin jam preventing element 108 suspended at a free end 108*a* of a flexible link 109 (same as for coin handling device 100), and a further coin jam preventing element 208*a*, which can move freely inside the coin container 103. The freely movable coin jam preventing element 208*a* can physically interact with the suspended coin jam preventing element 108 such that synergy between the two elements occur, thereby increasing the jam preventing ability.

Figure 2:
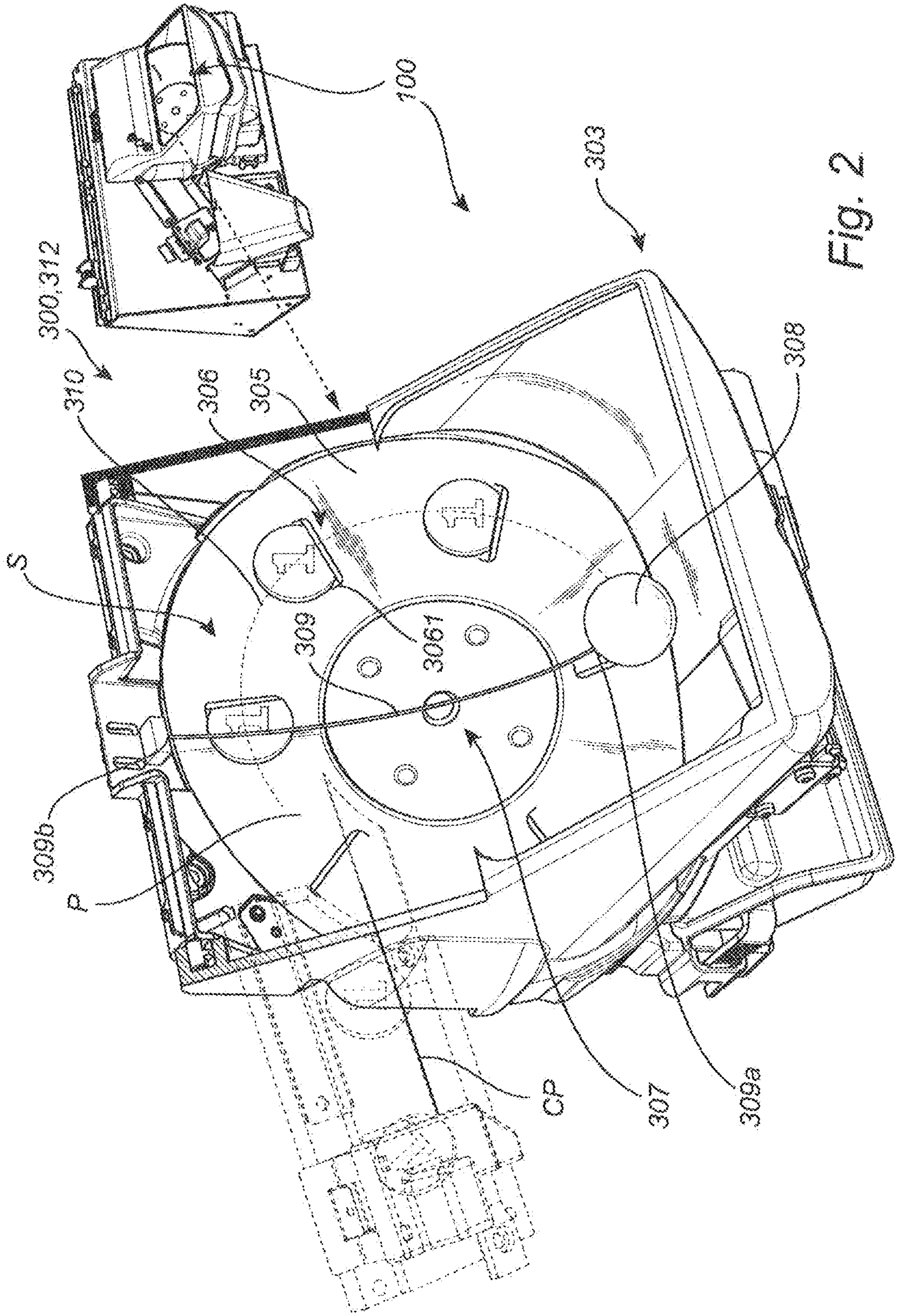
FIG. 2 is a perspective view of a coin handling device with a coin jam preventing arrangement according to embodiments of the invention.

FIG. 2 is a perspective view of a coin handling device 300 with a coin jam preventing arrangement 307. The coin handling device 300 is of an alternative kind often known as a coin feeding unit 312, and is typically used in coin handling machines for receiving a mass of coins of mixed denomination, and feed the coins one by one along a coin transport path 310 to an output position P for outputting the individual coin from the coin container 303. At the output position P, each coin may leave the coin feeding unit 312 along a predefined coin path CP. Typically, the coins are then analysed and/or sorted according to denomination. As can be seen in FIG. 2, the coins are received in a coin container 303, often referred to as a coin hopper. The received coins are then fed, one by one, by a rotatable disk 305 by means of coin engaging elements 306 on the rotatable disk 305. The coin engaging elements 306 of the embodiment shown in FIG. 2 are defined by protrusions 3061 for engaging the coins one by one. It, however, is equally plausible that the coin engaging elements 306 could be embodied as recesses (not shown), such as openings for holding individual coins therein. The coin jam preventing element 308 in FIG. 2 is suspended at the free end 309*a* of a flexible link 309.

Figure 3A:
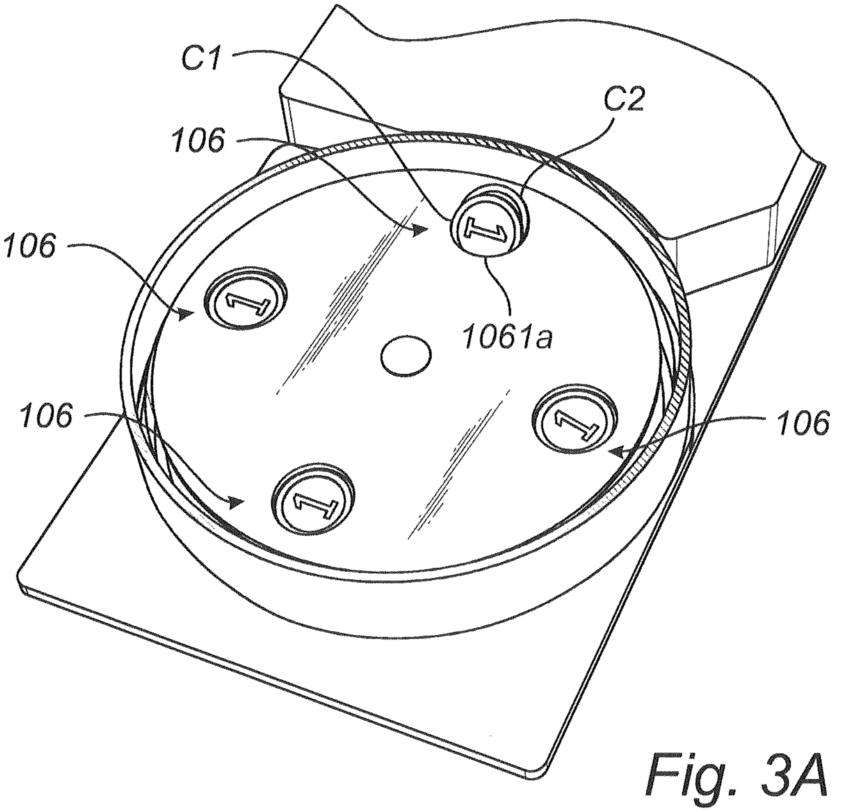
FIG. 3*a* illustrates a type of coin jam that is eliminated in the present invention.
Figure 3B:
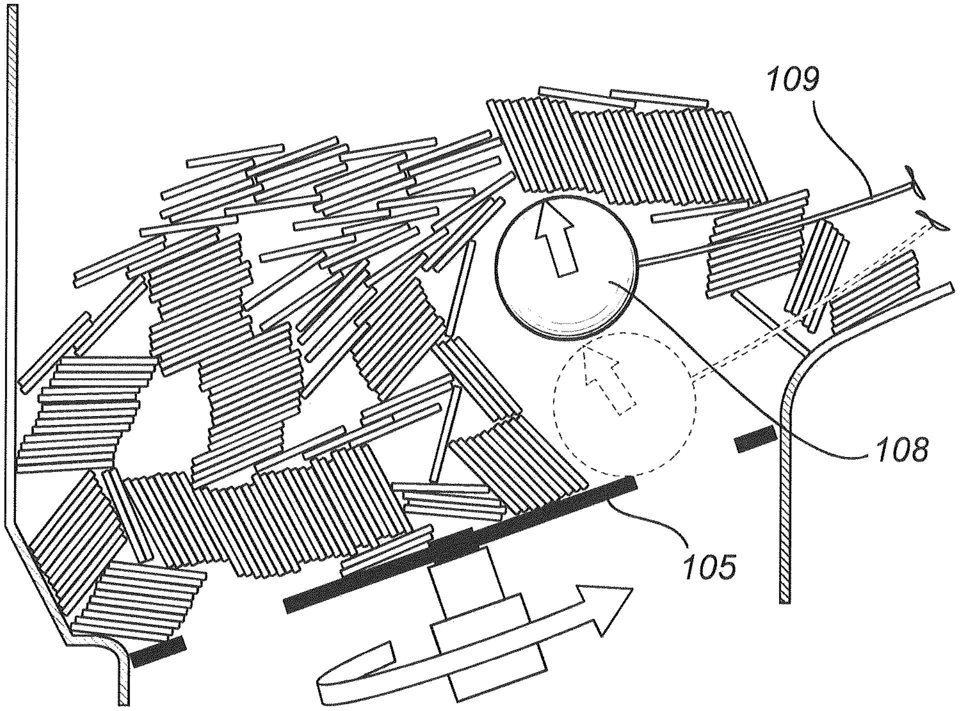
FIG. 3*b* illustrates a type of coin jam that is eliminated in the present invention.

FIGS. 3*a* and 3*b* serve to illustrate two different kinds of coin jam that may be eliminated, or prevented, by the present inventive concept. FIG. 3*a* shows the rotatable disk 105 of the coin handling device 100 (see FIGS. 1*a* and 1*b*) with four coin engaging elements 106 defined as through-openings for receiving coins. In one of the through-openings 1061*a*, two coins C1 and C2 have ended up on top of each other in the through-opening 1061*a* with both coins C1 and C2 partly protruding into the through-opening 1061*a*, thus effectively jamming the system. Such coin jams can occur when two or more coins get stacked at an angle when trying to pass through the through-opening 1061*a*.

FIG. 3*b* illustrates another type of coin jam that may be eliminated, or prevented, by the present inventive concept, illustrated here also for the coin handling device 100. The coin jam illustrated in FIG. 3*b* is commonly referred to as bridging. Bridging occurs when multiple coins form a bridge between stationary surfaces of the coin container 103. The arrows in FIG. 3*b* illustrates the rotational direction of the rotatable disk 105, and the direction of movement for the coin jam preventing element 108. Although the coin jam preventing element 108 in FIG. 3*b* is illustrated as a ball 108 suspended at a free end 109*a* of the flexible link 109, it is equally plausible that it could have been a freely moving unconnected ball 108 roaming within the volume V.

Figure 4:
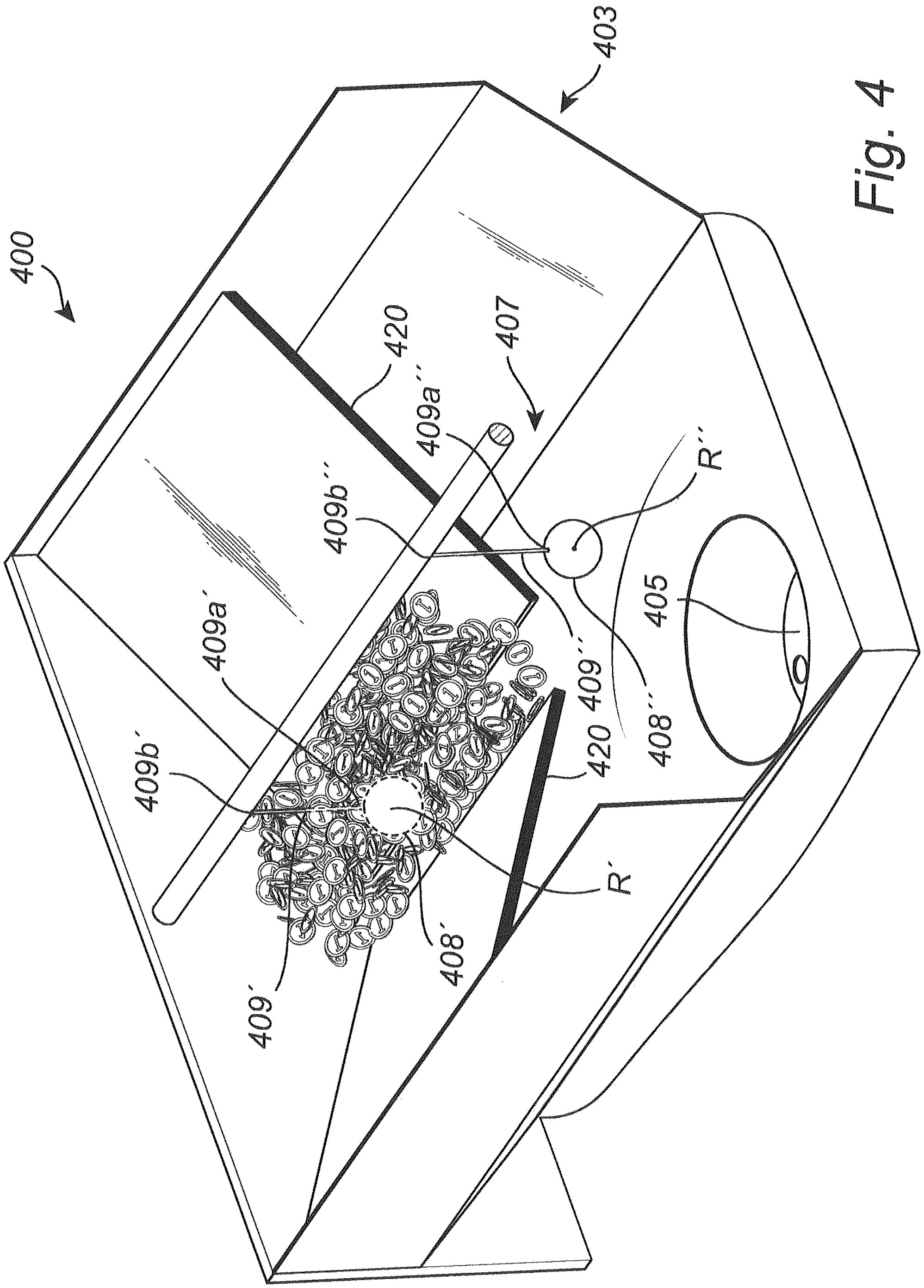
FIG. 4 is a perspective view of a coin handling device with a coin jam preventing arrangement according to embodiments of the invention.

FIG. 4 is a perspective view of a coin handling device 400 wherein the coin jam preventing arrangement 407 comprises two coin jam preventing elements 408',408". The coin handling device 400 is a coin dispenser of a different geometry than the coin handling device 100. In the coin container 403 shown in FIG. 4, angled protrusions 420 protrude from the coin container walls to define inclined surfaces, directing the mass of coins downward to the rotatable disk 405. In FIG. 4, both coin jam preventing elements 408' and 408" are suspended at an associated free end 409*a*', 409*a*" of the flexible links 409', 409", such that when in their respective resting position R', R", they are located at a distance from the inner walls of the container 403. As can be seen in FIG. 4, the respective rest positions of the two coin jam preventing elements 408', 408" are located in between the two angled protrusions 420. Also, the coin jam preventing elements 408', 408" are suspended such that they are not in direct contact with the rotatable disk 405 of the coin output arrangement 404.

Figure 5A:
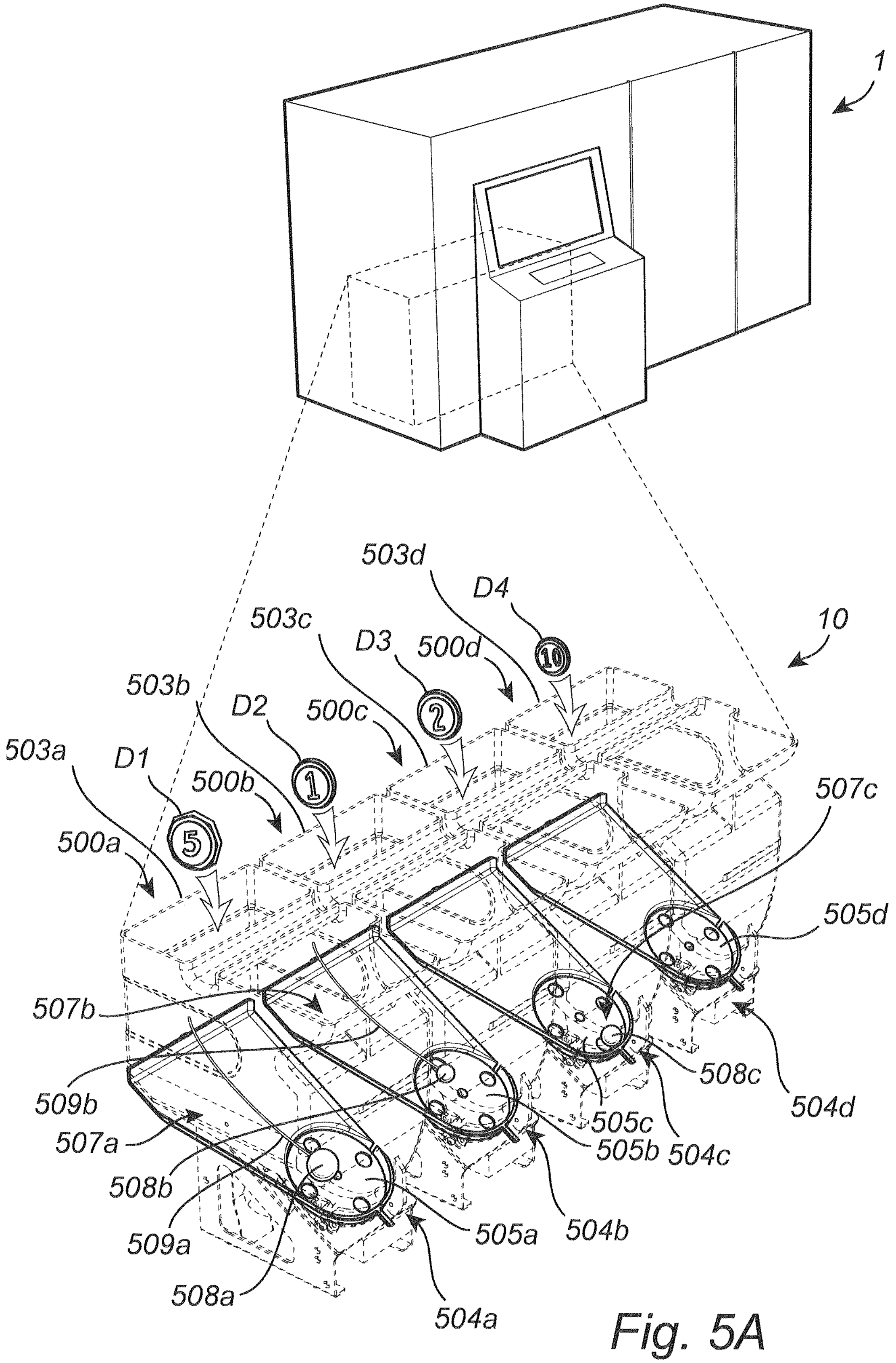
FIG. 5*a* shows a coin dispenser system for a coin handling machine according to embodiments of the invention.

FIG. 5*a* shows a coin dispenser system 10 for a coin handling machine 1. The coin dispenser system 10 in FIG. 5*a* comprises four separate coin dispensers 500*a-d*, each having coin output arrangements 504*a-d* comprising rotatable disks 505*a-d*. The four different coin dispensers 500*a-d* may contain four separate coin denominations. In the example embodiment, the coin dispensers 500*a-d* contain coins of an associated coin denomination D1-D4, which coin denominations are all mutually different from each other. Two of the coin dispensers, a first coin dispenser 500*a* and a second coin dispenser 500*b*, has associated coin jam preventing arrangements 507*a* and 507*b* being different from each other. From left to right: the first dispenser 500*a* has a ball 508*a* of a relatively large size, wherein the ball 508*a* is suspended by means of a flexible link 509*a*. The second dispenser 500*b* has a smaller sized ball 508*b* suspended by means of a flexible link 509*b*. The reason for using different coin jam preventing arrangements is that the coins of denomination D1 and D2 have different physical properties. Specifically, coins of the coin denomination D1 is larger and heavier than coins of the coin denomination D2. Also, coins of the coins of the coin denomination D1 has a non-circular edge. The different physical properties of the coins make their respective coin jamming abilities different. The third dispenser 500*c* has a ball 508*c* roaming freely in the volume V of the coin container. In the example, this has been found to be enough to prevent coin jam for coins of coin denomination D3. Finally, the fourth dispenser 500*d* has no coin jam preventing element. In the example, it was found that coins of denomination D4 were not prone to jamming in the coin dispenser 500*d*.

As understood by the person skilled in the art, different coin denominations may require different types of coin jam preventing arrangements. Also, some denominations may be less prone to coin jam. Therefore, coin jam preventing arrangements may not always be needed within a coin dispenser system disclosed herein. It serves to mention that the coin dispenser system 10 is merely an exemplary embodiment. It is equally plausible that a coin dispenser system comprises fewer or more dispensers. It is also plausible that all dispensers in a coin dispenser system have the same coin jam preventing arrangements, or that some dispensers have one type of coin jam preventing arrangement, and that the other dispensers have different or no coin jam preventing arrangements. One dispenser may contain more than one coin jam preventing element, wherein both are suspended or free, or one of each. It is also plausible that one dispenser has multiple coin jam preventing elements with varying properties, such as size, shape, weight, or density.

Figure 5B:
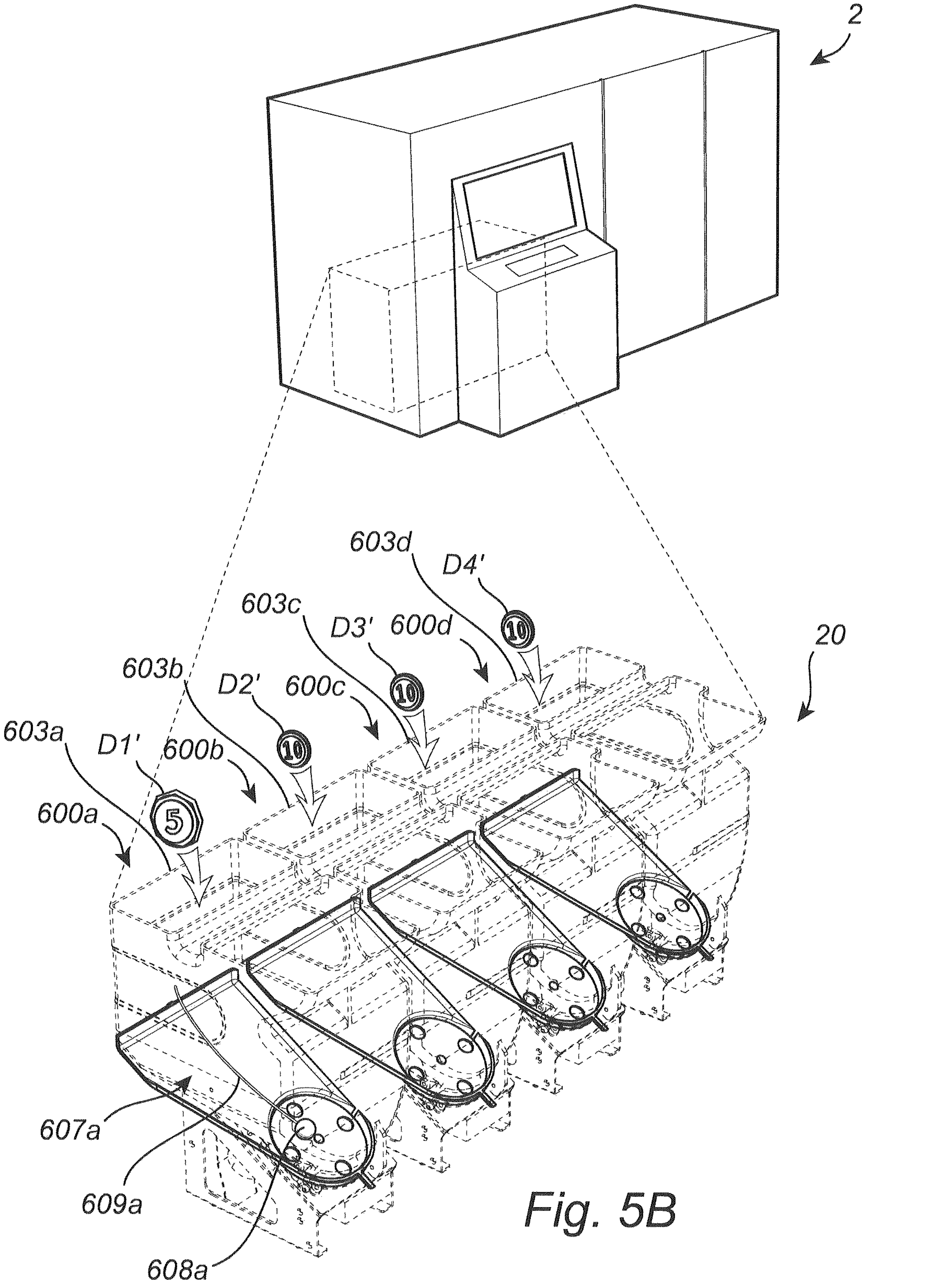
FIG. 5*b* shows a coin dispenser system for a coin handling machine according to embodiments of the invention.

FIG. 5*b* shows another coin dispenser system 20 for a coin handling machine 2. As for the coin dispenser system 10 in FIG. 5*a*, the coin dispenser system 20 comprises four dispensers 600*a-d* arranged to hold coins of coin denominations D1'-D4' respectively. However, the coin dispenser system 20 only has one coin dispenser, namely coin dispenser 600*a*, which is equipped with a coin preventing arrangement, namely coin preventing arrangement 607*a*. This is because coin denomination D1' was found to be the only coin denomination which includes coins prone to coin jam. This may sometimes be common in coin handling machines, since some denominations are more prone to jamming than others. The coin jam preventing element 608*a* in FIG. 5*b* is a ball suspended by means of a flexible link 509*a*.

FIGS. 6*a-d* show different shapes of the coin jam preventing element. The shape is preferably rounded, in that it contains no flat, or sharp edges so as not provide a surface which may form a basis for coins being stacked thereon. Different shapes can have different efficiencies for different coin denominations and/or different coin container geometries.

Figure 6A:
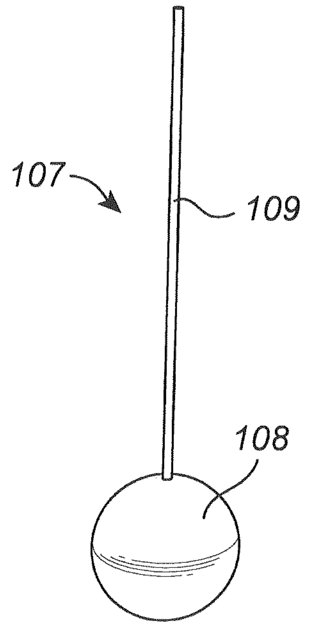
FIGS. 6*a-d* show different shapes of the coin jam preventing element according to different embodiments of the invention.
Figure 6B:
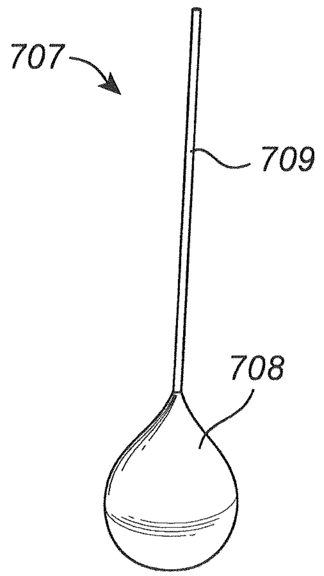
Figure 6C:
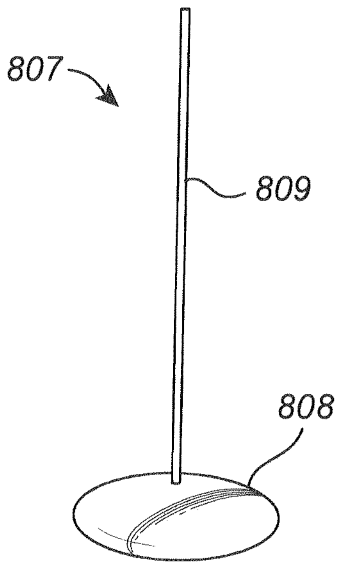
Figure 6D:
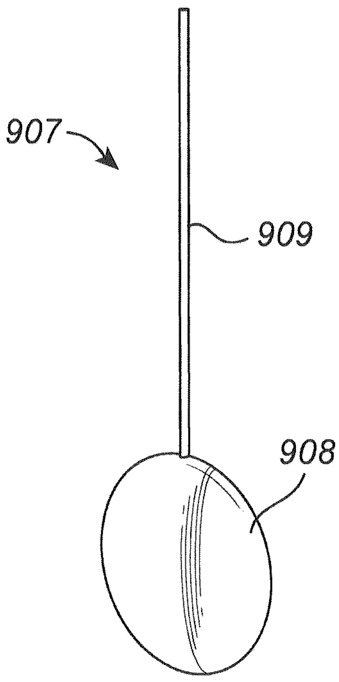

FIG. 6*a* illustrates the coin jam preventing element 108 from FIGS. 1*a* and 1*b*. The coin jam preventing element 108 is spherically shaped. An alternative embodiment is illustrated in FIG. 6*b*, showing the coin jam preventing element 708. The coin jam preventing element 708 has a drop-formed shape. A yet alternative embodiment is illustrated in FIG. 6*c*, showing the coin jam preventing element 808. The coin jam preventing element 808 has a prolate shape. A yet alternative embodiment is illustrated in FIG. 6*d*, showing the coin jam preventing element 908. The coin jam preventing element 908 has an oblate shape.

It is contemplated that there are numerous modifications of the embodiments described herein, which are still within the scope of the invention as defined by the appended claims.

The invention claimed is:

1. A coin handling device for a coin handling machine comprising:

a coin container configured to hold a mass of coins input thereto, wherein the coin container comprises a coin output arrangement arranged at a lower end thereof, said coin output arrangement being configured to output one or more coins of the mass of coins from the coin container;

wherein the coin output arrangement comprises a rotatable disk located at a bottom of the coin container, wherein the rotatable disk includes one or more coin engaging elements defined on the rotatable disk on a coin facing surface (S) thereof, each of the one or more coin engaging elements being configured to engage an individual coin of the mass of coins to allow said individual coin to be output from the coin container;

wherein the coin handling device further comprises a coin jam preventing arrangement including a coin jam preventing element and a flexible link consisting of one or more elements, said flexible link having a free end and a fixed end, wherein the coin jam preventing element is suspended in a predefined volume of the coin container facing the coin facing surface (S) of the rotatable disk at the free end of the flexible link such that the coin jam preventing element is configured to, as a result from gravity, strive to move towards a predetermined rest position within the predefined volume of the coin container while facing the coin facing surface (S) of the rotatable disk, and such that the coin jam preventing element is configured to, freely, move away from the predetermined rest position around within at least a portion of the predefined volume of the coin container at least at the lower end of the coin container while facing the coin facing surface (S) of the rotatable disk to physically interact with coins of the mass of coins present in the predefined volume of the coin container while striving to move back towards the predetermined rest position so as to thereby prevent coin jams from being formed or to break coin jams in the coin container.

2. The coin handling device according to claim 1, wherein each of the coin engaging elements is defined by walls surrounding a through-opening formed in the rotatable disk for allowing the individual coin to pass through the rotatable disk via the through-opening to be output from the coin container.

3. The coin handling device according to claim 2, wherein the coin handling device is a coin dispenser configured to dispense coins of the mass of coins individually from the coin container.

4. The coin handling device according to claim 2, wherein the coin handling device is a coin feeding unit configured to feed coins of the mass of coins, one by one, to an output position (P) of the coin feeding unit at which the output position (P) each coin is allowed to leave the coin feeding unit along a predefined coin path (CP).

5. The coin handling device according to claim 1, wherein each of the coin engaging elements is defined by a recess, or a protrusion, formed on the coin facing surface (S), wherein the recess, or the protrusion, is configured to engage with the individual coin to transport the same along a coin transport path for outputting the individual coin from the coin container.

6. The coin handling device according to claim 1, wherein the rotatable disk is inclined with respect to a horizontal plane (H) so as to define an upper coin engaging area (U) and a lower coin engaging area (L), and the coin jam preventing element is suspended at the free end of the flexible link such that the coin jam preventing element will, when residing in a rest position (R) of the flexible link, be located within the upper coin engaging area (U) and in contact with the coin facing surface of the rotatable disk.

7. The coin handling device according to claim 1, wherein the coin jam preventing element is suspended at the free end of the flexible link such that the coin jam preventing element will, when residing in a rest position (R', R") of the flexible link, be located distanced from the coin facing surface of the rotatable disk.

8. The coin handling device according to claim 1, wherein the flexible link is formed by one or more from: a wire, a string, a line and a chain.

9. The coin handling device according to claim 1, wherein the coin jam preventing element is made from a metallic material.

10. The coin handling device according to claim 1, wherein the coin jam preventing element has a weight exceeding a weight of each coin of the mass of coins.

11. The coin handling device according to claim 1, wherein the coin jam preventing element has a rounded shape.

12. The coin handling device according to claim 1, wherein the coin jam preventing arrangement further includes a further coin jam preventing element which is un-connected to the coin handling device such that the further coin jam preventing element is able to, freely, move around within the coin container to physically interact with the coin jam preventing element and the coins of the mass of coins present in the coin container.

13. The coin handling device according to claim 1, wherein the flexible link is formed by a string.

14. The coin handling device according to claim 1, wherein a range of movement of the coin jam preventing element within the portion of the predefined volume of the coin container is defined by dimensions of the coin container, a length of the flexible link, and a location of the free end of the flexible link.

15. A coin dispenser system for a coin handling machine, comprising:

a plurality of coin dispensers, wherein each coin dispenser comprises:

a coin container configured to hold a respective mass of coins input thereto, wherein the coin container comprises a coin output arrangement arranged at a lower end thereof, said coin output arrangement being configured to output one or more coins of the respective mass of coins from the coin container; and wherein the coin output arrangement comprises a rotatable disk located at a bottom of the coin container, wherein the rotatable disk includes one or more coin engaging elements defined on the rotatable disk on a coin facing surface (S) thereof, each of the one or more coin engaging elements being configured to engage an individual coin of the mass of coins to allow said individual coin to be output from the coin container;

wherein each coin dispenser of the plurality of coin dispensers is configured to dispense coins of the respective mass of coins individually from the coin container, and wherein the coin dispenser system comprises at least a first coin dispenser and a second coin dispenser among the plurality of coin dispensers and wherein the first and the second coin dispensers are configured to hold and output coins of a first individual denomination (D1) and a second (D2), different individual denomination, respectively, and wherein each of the first and the second coin dispensers further comprises an associated coin jam preventing arrangement each including a coin jam preventing element and a flexible link consisting of one or more elements, said flexible link having a free end and a fixed end, wherein the coin jam preventing element is suspended in a volume of the associated coin container facing the coin facing surface (S) of the rotatable disk at the free end of the flexible link such that the coin jam preventing element is configured to, as a result from gravity, strive to move towards a predetermined rest position within the volume of the associated coin container while facing the coin facing surface (S) of the rotatable disk, and such that the coin jam preventing element is configured to, freely, move away from the predetermined rest position around within at least a portion of the volume of the associated coin container while facing the coin facing surface (S) of the rotatable disk to physically interact with coins of the mass of coins present in the volume of the associated coin container while striving to move back towards the predetermined rest position so as to thereby prevent coin jams from being formed or to break coin jams in the associated coin container, and wherein the coin jam preventing arrangement of the first coin dispenser is adapted to the first individual denomination (D1) and the coin jam preventing arrangement of the second coin dispenser is adapted to the second individual denomination (D2) such that the coin jam preventing arrangement of the first coin dispenser is different from the coin jam preventing arrangement of the second coin dispenser.

16. The coin dispenser system according to claim 15, wherein the weight of the coin jam preventing element of the first and the second dispenser, respectively, is based on a weight and/or dimension of the first (D1) and the second (D2) individual denomination, respectively.

17. A coin handling machine comprising:

at least one coin handling device according to claim 3.

18. A coin handling machine comprising at least one coin handling device according to claim 4.

19. A coin handling machine comprising a coin dispenser system according to claim 15.

* * * * *